United States Patent
Liu et al.

(10) Patent No.: US 8,302,397 B2
(45) Date of Patent: Nov. 6, 2012

(54) MODE TRANSITION SYSTEMS AND METHODS FOR A SEQUENTIAL TURBOCHARGER

(75) Inventors: Zhiping Steven Liu, Canton, MI (US); B. Jerry Song, Novi, MI (US); Anupam Gangopadhyay, MRC Nagar (IN); Ping Ge, Northville Township, MI (US)

(73) Assignee: GM Global Technology Operations LLC

( * ) Notice: Subject to any disclaimer, the term of this patent is extended or adjusted under 35 U.S.C. 154(b) by 628 days.

(21) Appl. No.: 12/539,357

(22) Filed: Aug. 11, 2009

(65) Prior Publication Data
US 2011/0036086 A1 Feb. 17, 2011

(51) Int. Cl.
*F02D 23/00* (2006.01)
*F02B 33/44* (2006.01)
*F02B 33/00* (2006.01)

(52) U.S. Cl. ............... 60/602; 60/612; 123/562
(58) Field of Classification Search ............... 60/602, 60/612; 123/562; 701/102
See application file for complete search history.

(56) References Cited

U.S. PATENT DOCUMENTS

| | | | | |
|---|---|---|---|---|
| 4,671,068 A * | 6/1987 | Moody et al. ................ | 60/602 |
| 6,161,383 A * | 12/2000 | Aschner et al. .............. | 60/602 |
| 6,256,992 B1 * | 7/2001 | Lewis et al. .................. | 60/603 |
| 6,272,859 B1 * | 8/2001 | Barnes et al. ................ | 60/602 |
| 6,305,167 B1 * | 10/2001 | Weisman et al. ............. | 60/602 |
| 6,457,461 B1 * | 10/2002 | Romzek ....................... | 60/602 |
| 6,508,237 B2 * | 1/2003 | Romzek et al. .............. | 60/605.2 |
| 6,510,691 B1 * | 1/2003 | Schmid ....................... | 60/602 |
| 6,601,387 B2 * | 8/2003 | Zurawski et al. ........... | 60/605.2 |
| 6,732,523 B2 * | 5/2004 | Birkner et al. ............... | 60/605.1 |
| 6,801,846 B1 * | 10/2004 | Rodriguez et al. ........... | 701/102 |
| 7,076,953 B2 * | 7/2006 | Kreso ........................... | 60/605.2 |
| 7,284,375 B2 * | 10/2007 | Butscher et al. .............. | 60/602 |
| 7,607,302 B2 * | 10/2009 | Fry et al. ...................... | 60/612 |
| 7,735,320 B2 * | 6/2010 | Yanakiev ...................... | 60/602 |
| 7,748,218 B2 * | 7/2010 | McNulty et al. .............. | 60/612 |
| 7,958,730 B2 * | 6/2011 | Stewart ......................... | 60/612 |
| 2003/0101723 A1 * | 6/2003 | Birkner et al. ................ | 60/602 |
| 2008/0078176 A1 * | 4/2008 | de Ojeda ...................... | 60/605.2 |
| 2010/0058757 A1 * | 3/2010 | Mueller et al. ................ | 60/602 |
| 2011/0079008 A1 * | 4/2011 | de Ojeda ...................... | 60/602 |
| 2011/0113773 A1 * | 5/2011 | Liu et al. ...................... | 60/602 |

FOREIGN PATENT DOCUMENTS
JP 2005098250 A * 4/2005
* cited by examiner

*Primary Examiner* — Thai Ba Trieu (57) ABSTRACT

A system for a sequential turbocharger includes a mode selection module, a feed-forward selection module, and a control loop module. The mode selection module generates a control mode signal based on an engine speed signal, an engine torque signal, and an engine mode signal. The control mode signal indicates one of an open-loop control mode and a closed-loop control mode. The feed-forward selection module determines a feed-forward value based on the control mode signal, the engine speed signal, and the engine torque signal. The control loop module determines a loop control value at least one of based on the feed-forward value, a variable geometry turbine (VGT) control signal, and an error signal; and based on a bypass valve (BPV) control signal and the error signal when the control mode signal transitions from the open-loop control mode to the closed-loop control mode.

21 Claims, 5 Drawing Sheets

MODE TRANSITION SYSTEMS AND METHODS FOR A SEQUENTIAL TURBOCHARGER

FIELD

The present disclosure relates to internal combustion engines, and more particularly to sequential turbocharger control systems.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

An internal combustion engine (ICE) may use a sequential turbocharger to increase torque output by delivering additional air into cylinders of the ICE. The sequential turbocharger may be a two-stage turbocharger system. The sequential turbocharger may include a high-pressure turbocharger and a low-pressure turbocharger that are arranged in series. The high-pressure turbocharger may include a high-pressure turbine and a high-pressure compressor. The low-pressure turbocharger may include a low-pressure turbine and a low-pressure compressor.

The high-pressure turbine and the low-pressure turbine may be controlled separately to adjust flow of exhaust gas. The exhaust gas flows through the high-pressure turbine and then through the low-pressure turbine when the engine is operating at low speeds. The flow of exhaust gas through the turbines can reduce response time of turbocharger boost, referred to as turbo lag.

The turbo lag may be controlled using a bypass valve (BPV) and a variable geometry turbine (VGT). The high-pressure turbine may include the BPV and the VGT. The VGT has a set of movable vanes that are used to control pressure of the exhaust gas flowing through the VGT. The flow of exhaust gas is low at low engine speeds. The vanes are partially closed to accelerate the VGT when the flow of exhaust gas through the VGT is low. Accelerating the VGT increases boost pressure delivered to the high-pressure compressor in the high-pressure turbocharger. As engine speed increases, the vanes are opened to reduce speed of the VGT. Reducing speed of the VGT prevents the boost pressure from exceeding a predetermined level. The BPV may open redirecting the flow of exhaust gas through the BPV when the VGT is operating at high speeds. The BPV relieves the boost pressure of the VGT before exceeding the predetermined level.

SUMMARY

In one embodiment, a system is provided that includes a mode selection module, a feed-forward selection module, and a control loop module. The mode selection module generates a control mode signal based on an engine speed signal, an engine torque signal, and an engine mode signal. The control mode signal indicates one of an open-loop control mode and a closed-loop control mode. The feed-forward selection module determines a feed-forward value based on the control mode signal, the engine speed signal, and the engine torque signal. The control loop module determines a loop control value based on the feed-forward value, a variable geometry turbine (VGT) control signal, and an error signal when the control mode signal transitions from the open-loop control mode to the closed-loop control mode.

In other features, a method of controlling a sequential turbocharger is provided. The method includes generating a control mode signal based on an engine speed signal, an engine torque signal, and an engine mode signal. The control mode signal indicates one of an open-loop control mode and a closed-loop control mode. A feed-forward value is determined based on the control mode signal, the engine speed signal, and the engine torque signal. A loop control value is determined based on the feed-forward value, a variable geometry turbine (VGT) control signal, and an error signal when the control mode signal transitions from the open-loop control mode to the closed-loop control mode.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

An engine may be configured with a sequential turbocharger to regulate airflow supplied to cylinders of the engine. The airflow may be controlled by multiple control actuators. The control actuators may include a VGT and a BPV. The VGT and BPV operate in different control modes under different engine conditions. The control modes may switch between an open-loop control mode and a closed-loop control mode. A smooth transition (i.e., minimal changes in boost pressures) between the control modes is desired to meet emission targets, to satisfy fuel economy targets, and to improve drivability. Due to highly non-linear characteristics of the control actuators, the transition may be uneven if not properly controlled.

The embodiments of the present disclosure provide techniques for controlling a sequential turbocharger. The techniques may reduce the amount of changes in boost pressures and provide smooth transitions between control modes. This increases fuel efficiency and improves engine durability while satisfying emission requirements.

Figure 1:
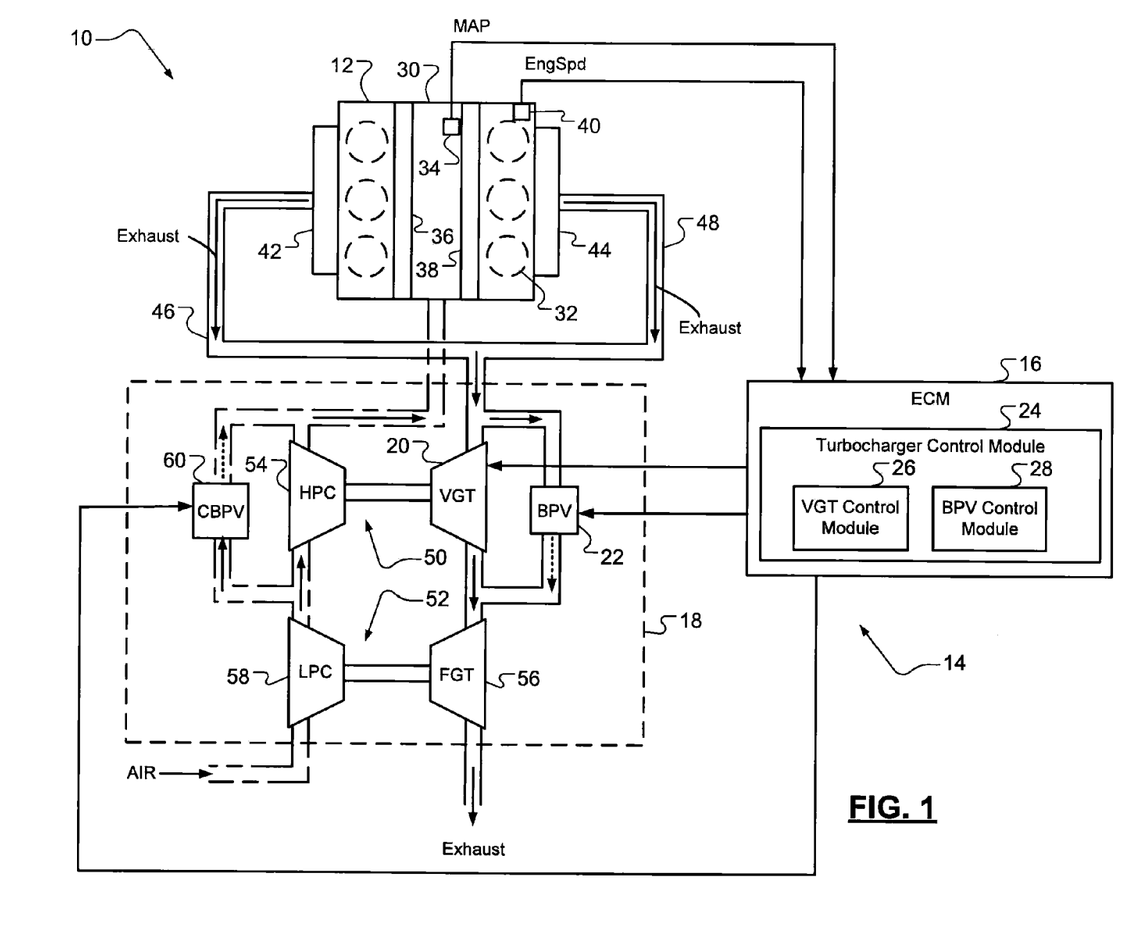
FIG. 1 is a functional block diagram of an engine control system in accordance with an embodiment of the present disclosure.

In FIG. 1, an exemplary engine control system 10 of a vehicle is shown. The engine control system 10 may include an engine 12 and a turbocharger control system 14. The turbocharger control system 14 may include an engine control module 16 with a two-step turbocharger system 18. The two-step turbocharger system 18 actuates a VGT 20 and a BPV 22 to control an amount of air supplied to the engine 12 for combustion.

Figure 2:
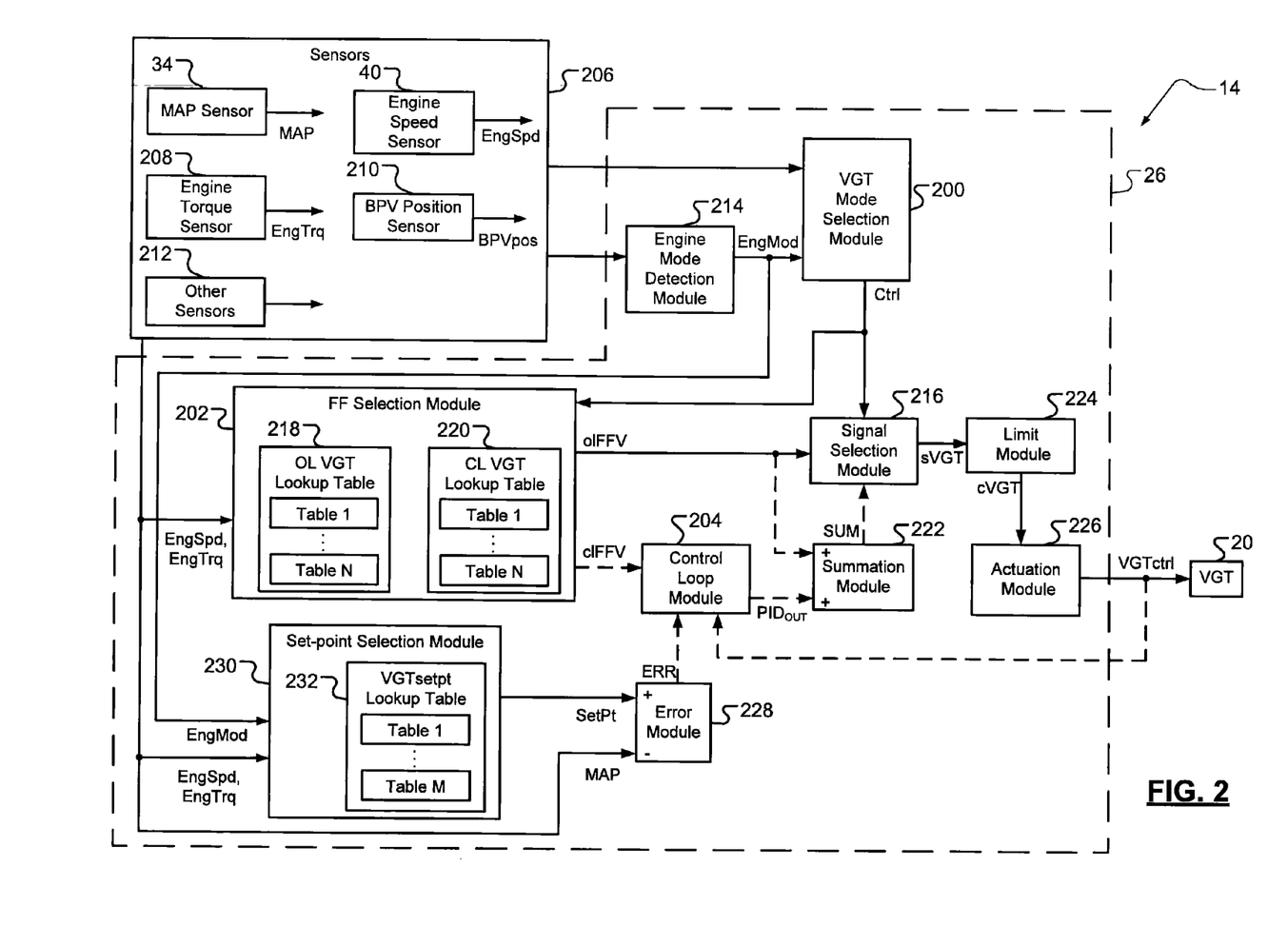
FIG. 2 is a functional block diagram of a VGT control system in accordance with an embodiment of the present disclosure.
Figure 3:
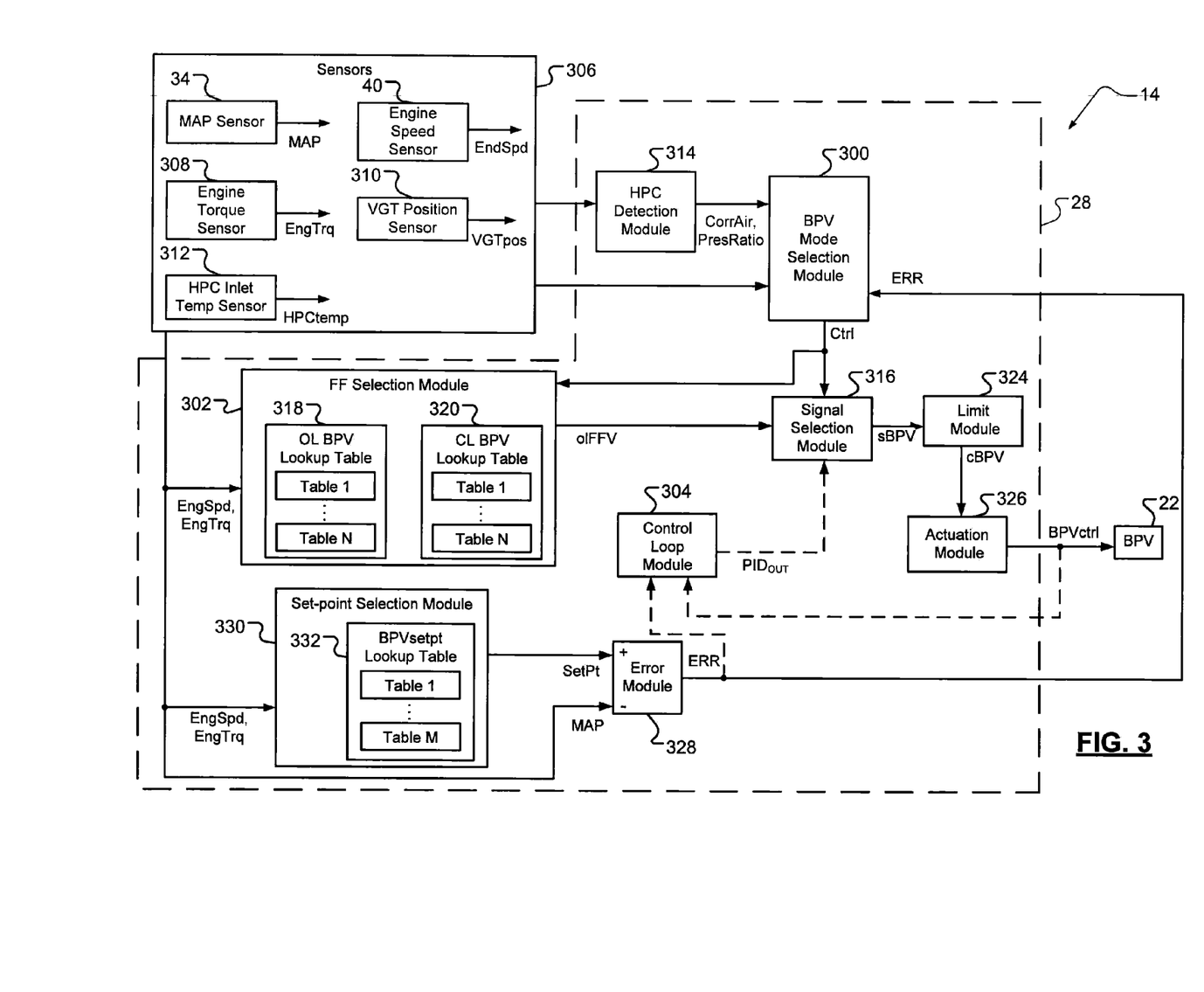
FIG. 3 is a functional block diagram of a BPV control system in accordance with an embodiment of the present disclosure.

The engine control module 16 may include a turbocharger control module 24. The turbocharger control module 24 coordinates control of the VGT 20 and the BPV 22. The turbocharger control module 24 may include a VGT control module 26 and a BPV control module 28. The VGT control module 26 controls opening and closing of vanes in the VGT 20 based on an engine speed signal EngSpd, an engine torque signal EngTrq, an engine mode signal EngMod, and a BPV position signal BPVpos. An example of the VGT control module is illustrated in FIG. 2. The BPV control module 28 controls opening and closing of the BPV 22 based on the engine speed signal EngSpd, the engine torque signal EngTrq, an error signal ERR, a VGT position signal VGTpos, a corrected airflow value CorrAir, and a pressure ratio PresRatio. An example of the BPV control module is illustrated in FIG. 3.

During engine operation, air is drawn into an intake manifold 30. The air within the intake manifold 30 is distributed into cylinders 32. An intake manifold absolute pressure (MAP) sensor 34 may detect an air pressure within the intake manifold 30 and generate a MAP signal MAP. Although FIG. 1 depicts six cylinders, the engine 12 may include any number of cylinders 32. While a gasoline powered internal combustion engine is shown, the embodiments disclosed herein apply to diesel or alternative fuel sourced engines.

Fuel is combined with the air and drawn into the cylinders 32 via fuel rails 36, 38. An air/fuel mixture is compressed and ignited in the cylinders 32 to produce drive torque. The drive torque may increase an engine speed. An engine speed sensor 40 may measure speed of the engine 12 in revolutions per minute (RPM). Combustion exhaust within the cylinders 32 is forced out via exhaust manifolds 42, 44. The exhaust travels through exhaust conduits 46, 48, and is directed to the two-step turbocharger system 18.

The two-step turbocharger system 18 may include a high-pressure turbocharger 50 and a low-pressure turbocharger 52. The high-pressure turbocharger 50 may include the VGT 20 and a high-pressure compressor 54. The high-pressure compressor 54 spins and forces air into the cylinders 32 when exhaust flows through the VGT 20. The VGT 20 may have a set of movable vanes (not shown) to control pressure of the exhaust flowing through the high-pressure turbocharger 50. The vanes are partially closed to increase the speed of the high-pressure turbocharger 50 when the exhaust flow is low. As engine speed increases, the vanes may open to reduce the speed of the high-pressure turbocharger 50.

The low-pressure turbocharger 52 may include a fixed geometry turbine (FGT) 56 and a low-pressure compressor 58. The exhaust through the FGT 56 causes the low-pressure compressor 58 to spin and compress air. The exhaust flows from the exhaust manifolds 42, 44 into the VGT 20 and then through the FGT 56 when the engine 12 is operating at low speeds. By allowing exhaust to flow through the high-pressure turbocharger 50 and then the low-pressure turbocharger 52, turbo lag may be reduced. As the engine speed increases, the BPV 22 may open to bypass the exhaust flow and allow the exhaust to flow through the FGT 56. A compressor bypass valve (CBPV) 60 may operate in conjunction with the BPV 22. In another embodiment, the CBPV 60 and the BPV 22 may operate independently. The CBPV 60 prevents the high-pressure compressor 54 from spinning faster than a predetermined speed, causing harm to the two-step turbocharger system 18.

In FIG. 2, the turbocharger control system 14 for the VGT 20 of the two-stage turbocharger system 18 is shown. The turbocharger control system 14 may include the VGT control module 26. The VGT control module 26 may include a VGT mode selection module 200, a feed-forward selection module 202, and a control loop module 204.

The VGT mode selection module 200 may receive signals from sensors 206. The sensors 206 may include the MAP sensor 34, the engine speed sensor 40, an engine torque sensor 208, a BPV position sensor 210, and other sensors 212. The other sensors 212 may include an oxygen sensor, an engine coolant temperature sensor, a mass airflow (MAF) sensor, and/or an altitude sensor.

The engine speed sensor 40 may generate an engine speed signal EngSpd indicating the engine speed in RPM. The engine torque sensor 208 may generate an engine torque signal EngTrq indicating output torque of the engine 12. The BPV position sensor 210 may generate a BPV position signal BPVpos corresponding to an amount of opening of the BPV 22 including fully closed, fully opened and positions therebetween. An engine mode detection module 214 may generate an engine mode signal EngMod based on signals received from a set of the sensors 206.

The VGT mode selection module 200 may generate a control mode signal Ctrl based on the engine speed signal EngSpd, the engine torque signal EngTrq, the BPV position signal BPVpos, and the engine mode signal EngMod. The control mode signal Ctrl indicates a control mode in which the VGT 20 is operated. The control mode may be at least one of an open-loop control mode and a closed-loop control mode. The open-loop control mode indicates that the turbocharger control system 14 is controlled based on an input signal, such as the engine speed signal EngSpd and the engine torque signal EngTrq, without feedback. A set of input signals may be used to determine a feed forward value to operate the VGT 20 and the BPV 22. A system in the open-loop control mode is an open-loop control system.

However, a system that uses feedback is a closed-loop control system. The feedback is used to make decisions about changes to control signals that operate the VGT 20 and the BPV 22. The closed-loop control mode indicates that the turbocharger control system 14 is controlled by a feedback system that receives a set-point signal and a feed forward value. The set-point signal indicates a desired VGT or BPV position as an input to the feedback system. The feed forward value may be an additional input to the feedback system. The closed-loop control system provides greater accuracy over the open-loop control system because of an ability to adjust the control signals based on the feedback.

The VGT mode selection module 200 transmits the control mode signal Ctrl to the feed-forward selection module 202 and a signal selection module 216. The feed-forward selection module 202 may receive the control mode signal Ctrl and determine a feed-forward value based on the control mode signal Ctrl, the engine speed signal EngSpd, and the engine torque signal EngSpd. The feed-forward value may be stored in a lookup table and may be indexed based on engine speed and engine torque. The lookup table may include a different set of feed-forward values depending on the control mode of the turbocharger control system 14.

For example only, the feed-forward selection module 202 may access an open-loop feed-forward value olFFV from an open-loop VGT lookup table 218 when the control mode signal indicates an open-loop control mode. The open-loop VGT lookup table 218 may include a set of tables (e.g. Table 1-N, where N is an integer) indexed by the engine speed signal EngSpd and the engine torque signal EngTrq. Similarly, the feed-forward selection module 202 may access a closed-loop feed-forward value clFFV from a closed-loop VGT lookup table 220 when the control mode signal Ctrl indicates a closed-loop control mode. The closed-loop VGT lookup table 220 may include a set of tables that are indexed based on the engine speed signal EngSpd and the engine torque signal EngTrq.

In the open-loop control mode, the feed-forward selection module 202 may transmit the open-loop feed-forward value olFFV to the signal selection module 216. The signal selection module 216 may select one of the open-loop feed-forward value olFFV and a summation value SUM generated by a summation module 222. The signal selection module 216 may generate a selected VGT signal sVGT based on the open-loop feed-forward value olFFV, the summation value SUM, and the control mode signal Ctrl. The signal selection module 216 may transmit the selected VGT signal sVGT to a limit module 224.

The limit module 224 scales the selected VGT signal sVGT to be within an operating range of the VGT 20. For example, if 0 represents a VGT closed state and 1 represents a VGT open state, the limit module 224 may scale the selected VGT signal sVGT to a value between 0 and 1. The limit module 224 generates a scaled VGT signal cVGT based on the selected VGT signal sVGT and transmits the scaled VGT signal cVGT to an actuation module 226. The actuation module 226 may generate a VGT control signal VGTctrl based on the scaled VGT signal cVGT to actuate vanes in the VGT 20.

In the closed-loop control mode, the feed-forward selection module 202 may transmit the closed-loop feed-forward value clFFV to the control loop module 204. The control loop module 204 may be a single input single output (SISO) controller or a multiple input multiple output (MIMO) controller. For example, the control loop module 204 may be a proportional integral derivative (PID) controller or a variation thereof (e.g. a PI controller).

The control loop module 204 determines a loop control value $PID_{OUT}$ based on the closed-loop feed-forward value clFFV, the VGT control signal VGTctrl, and an error signal ERR. The error signal may be generated by an error module 228 based on a set-point signal SetPt and the MAP signal MAP. The error module 228 compares the set-point signal SetPt generated by a set-point selection module 230 to the MAP signal MAP from the MAP sensor 34. The error module 228 generates the error signal ERR that represents a difference between the set-point signal SetPt and the MAP signal MAP.

The set-point signal SetPt may be generated by the set-point selection module 230 based on the engine mode signal EngMod, the engine speed signal EngSpd, and the engine torque signal EngTrq. For example only, the set-point selection module 230 may access a VGT set-point value from a VGT set-point lookup table 232. The VGT set-point lookup table may include a set of tables (e.g. Tables 1-M, where M is an integer) indexed based on the engine speed signal EngSpd and the engine torque signal EngTrq.

The control loop module 204 may transmit the loop control value $PID_{OUT}$ to the summation module 222. The summation module 222 sums the loop control value $PID_{OUT}$ and the open-loop feed-forward value olFFV to generate a summation value SUM. The summation module 222 transmits the summation value SUM to the signal selection module 216. The signal selection module 216 may select one of the open-loop feed-forward value olFFV and the summation value SUM. The signal selection module 216 may generate a selected VGT signal sVGT based on the open-loop feed-forward value olFFV, the summation value SUM, and the control mode signal Ctrl. The signal selection module 216 may transmit the selected VGT signal sVGT to the limit module 224.

As in the open-loop control mode, the limit module 224 scales the selected VGT signal sVGT to be within an operating range of the VGT 20. The limit module 224 generates a scaled VGT signal cVGT based on the selected VGT signal sVGT and transmits the scaled VGT signal cVGT to the actuation module 226. The actuation module 226 may generate a VGT control signal VGTctrl based on the scaled VGT signal cVGT to actuate the vanes in the VGT 20. Additionally, the actuation module 226 transmits the VGT control signal VGTctrl to the control loop module 204. This provides a feedback path for closed loop control.

In FIG. 3, the turbocharger control system 14 for a BPV 22 of the two-stage turbocharger system 18 is shown. The turbocharger control system 14 may include the BPV control module 28. The BPV control module 28 may include a BPV mode selection module 300, a feed-forward selection module 302, and a control loop module 304.

The BPV mode selection module 300 may receive signals from sensors 306. The sensors 306 may include the MAP sensor 34, the engine speed sensor 40, an engine torque sensor 308, a VGT position sensor 310, and a high-pressure compressor (HPC) inlet temperature sensor 312. The engine speed sensor 40 may generate an engine speed signal EngSpd indicating the engine speed in RPM. The engine torque sensor 308 may generate an engine torque signal EngTrq indicating output torque of the engine 12. The VGT position sensor 310 may generate a VGT position signal VGTpos corresponding to an amount of opening of VGT's vanes (not shown) including fully closed, fully opened and positions therebetween.

The BPV mode selection module 300 may generate a control mode signal Ctrl on the engine speed signal EngSpd, the engine torque signal EngTrq, the VGT position signal VGTpos, a corrected airflow value CorrAir, a HPC pressure ratio PresRatio, and an error signal ERR. The corrected airflow value CorrAir may be determined by a HPC detection module 314 based on a MAP signal MAP from the MAP sensor 34 and a temperature signal HPCtemp from the HPC inlet temperature sensor 312. The HPC pressure ratio PresRatio may also be determined by the HPC detection module 314 based on a pressure ratio between a HPC inlet pressure and a HPC outlet pressure. The HPC inlet pressure is a pressure value measured at an inlet of the HPC 54. The HPC outlet pressure is a pressure value measured at an outlet of the HPC 54. The error signal ERR may be generated by an error module 328 based on a set-point signal SetPt and the MAP signal MAP.

The BPV mode selection module 300 transmits the control mode signal Ctrl to the feed-forward selection module 302 and a signal selection module 316. The feed-forward selection module 302 may receive the control mode signal Ctrl and determine a feed-forward value based on the control mode signal Ctrl, the engine speed signal EngSpd, and the engine torque signal EngTrq. The feed-forward value may be stored in a lookup table indexed based on engine speed and engine torque. The lookup table may include a different set of feed-forward values depending on the control mode of the turbocharger control system 14.

For example only, the feed-forward selection module 302 may access an open-loop feed-forward value olFFV from an open-loop BPV lookup table 318 when the control mode signal Ctrl indicates an open-loop control mode. The open-loop BPV lookup table may include a set of tables (e.g. Table 1-N, where N is an integer) indexed based on the engine speed signal and the engine torque signal. Similarly, the feed-forward selection module 302 may access a closed-loop feed-forward value clFFV from a closed-loop BPV lookup table 320 when the control mode signal Ctrl indicates a closed-loop control mode. The closed-loop BPV lookup table may include a set of tables indexed based on the engine speed signal and the engine torque signal.

In the open-loop control mode, the feed-forward selection module 302 may transmit the open-loop feed-forward value olFFV to the signal selection module 316. The signal selection module 316 may select one of the open-loop feed-forward value olFFV and a loop control value $PID_{OUT}$ generated by the control loop module 304. The signal selection module 316 may generate a selected BPV signal sBPV based on the open-loop feed-forward value olFFV, the loop control value $PID_{OUT}$, and the control mode signal Ctrl. The signal selection module 316 may transmit the selected BPV signal sBPV to a limit module 324.

The limit module 324 scales the selected BPV signal sBPV to be within an operating range of the BPV 22. The limit module 324 generates a scaled BPV signal cBPV based on the selected BPV signal sBPV and transmits the scaled BPV signal cBPV to an actuation module 326. The actuation module 326 may generate a BPV control signal BPVctrl based on the scaled BPV signal cBPV to actuate the BPV 22.

In the closed-loop control mode, the feed-forward selection module 302 may transmit the closed-loop feed-forward value clFFV to the control loop module 304. The control loop module 304 may be a single input single output (SISO) controller or a multiple input multiple output (MIMO) controller. For example, the control loop module 304 may be a proportional integral derivative (PID) controller or a variation thereof (e.g. a PI controller).

The control loop module 304 determines the loop control value $PID_{OUT}$ based on the BPV control signal BPVctrl and an error signal ERR. The error signal ERR may be generated by the error module 328 based on the set-point signal SetPt and the MAP signal MAP. The error module 328 compares the set-point signal SetPt generated by a set-point selection module 330 to the MAP signal MAP from the MAP sensor 34. The error module 328 generates the error signal ERR that represents a difference between the set-point signal SetPt and the MAP signal MAP.

The set-point signal SetPt may be generated by the set-point selection module 330 based on the engine speed signal EngSpd and the engine torque signal EngTrq. For example only, the set-point selection module 330 may access a BPV set-point value from a BPV set-point lookup table 332. The BPV set-point lookup table may include a set of tables (e.g. Table 1-M, where M is an integer) indexed based on the engine speed signal EngSpd and the engine torque signal EngTrq.

The control loop module 304 may transmit the loop control value $PID_{OUT}$ to the signal selection module 316. The signal selection module 316 may select one of the open-loop feed-forward value olFFV and the loop control value $PID_{OUT}$. The signal selection module 316 may generate a selected BPV signal sBPV based on the open-loop feed-forward value olFFV, the loop control value $PID_{OUT}$, and the control mode signal Ctrl. The signal selection module 316 may transmit the selected BPV signal sBPV to the limit module 324.

As in the open-loop control mode, the limit module 324 scales the selected BPV signal sBPV to be within an operating range of the BPV 22. The limit module 324 generates a scaled BPV signal cBPV based on the selected BPV signal sBPV and transmits the scaled BPV signal cBPV to the actuation module 326. The actuation module 326 may generate a BPV control signal BPVctrl based on the scaled BPV signal cBPV to actuate the BPV 22. Additionally, the actuation module 326 may transmit the BPV control signal BPVctrl to the control loop module 304. This provides a feedback path for closed loop control.

Although the VGT control module 26 and the BPV control module 28 are described separately with respect to the exemplary engine control module 16, the control modules 26, 28 of the present disclosure may be combined into one system or may be distributed into distinct systems. For example only, the VGT control module 26 and BPV control module 28 may be combined together into one system. The VGT mode selection module 200 and the BPV mode selection module 300 combined together may generate control mode signals for a VGT and a BPV respectively. Also, the signal selection modules 216, 316 may operate as one system. The limit modules 224, 324, and the actuation modules 226, 326 may additionally be in the same system to actuate both the VGT and the BPV.

Figure 4A:
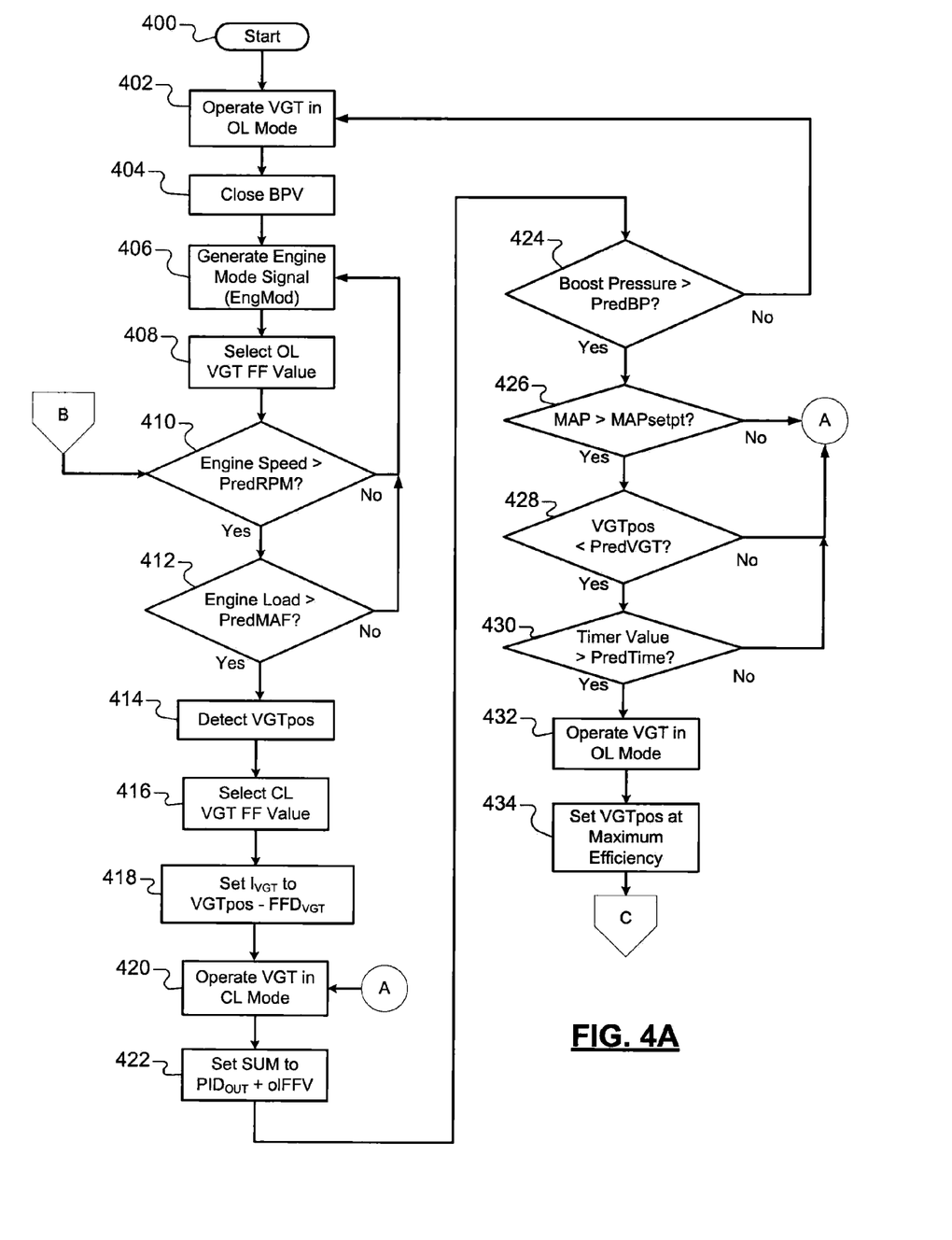
FIGS. 4A and 4B illustrate a method of controlling a VGT and a BPV in accordance with an embodiment of the present disclosure.
Figure 4B:
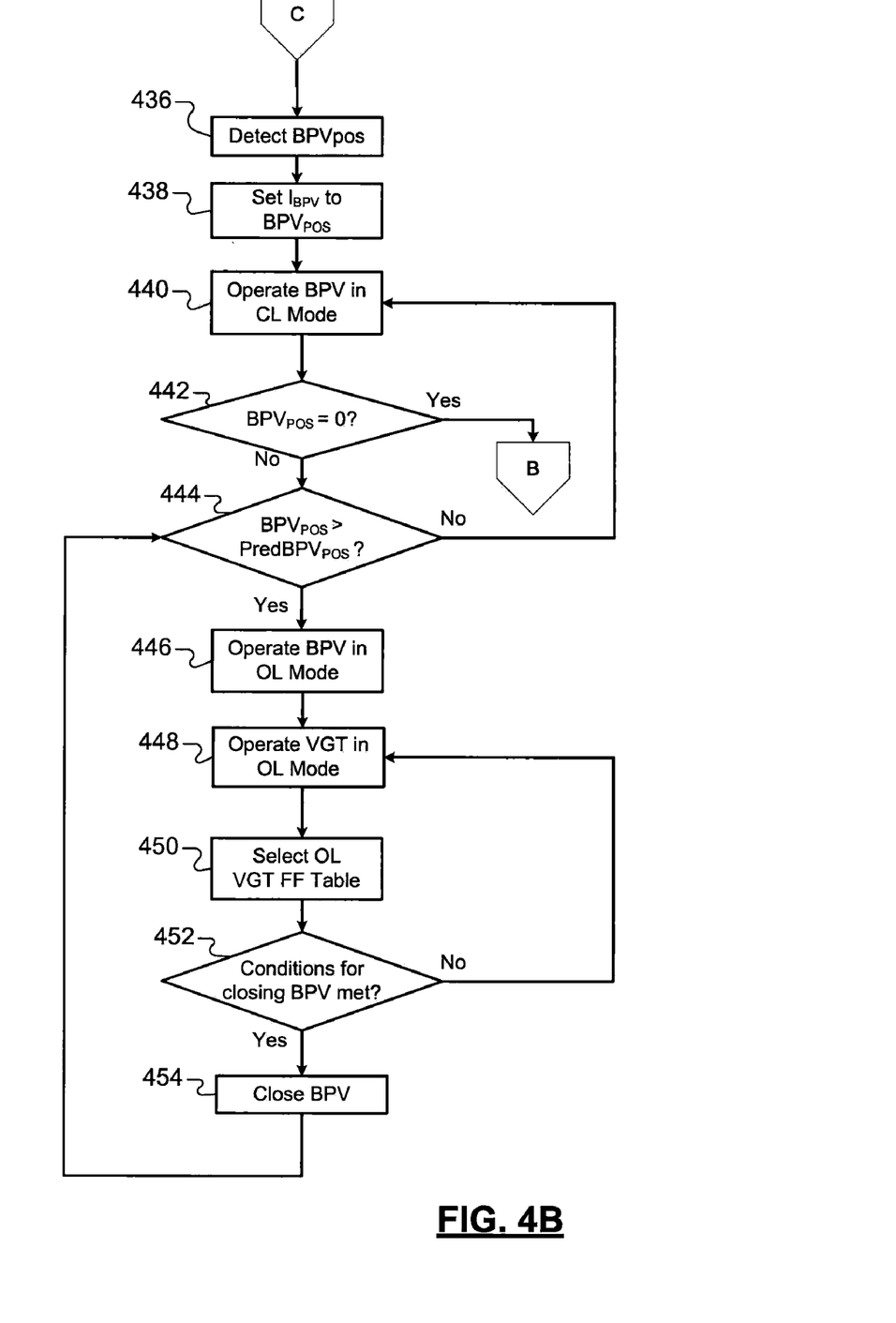

In FIGS. 4A and 4B, an exemplary method of controlling the VGT 20 and the BPV 22 of the turbocharger control system 14 is shown. Although the following steps are primarily described with respect to the embodiments of FIGS. 1-3, the steps may be modified to apply to other embodiments of the present invention.

The method may begin at step 400. In step 402, a VGT mode selection module 200 may initially generate a control mode signal Ctrl that indicates an open-loop control mode. The open-loop control mode indicates that vanes in the VGT 20 are actuated based on input signals. The input signals may include an engine speed signal EngSpd, an engine torque signal EngTrq, a BPV position signal BPVpos, and an engine mode signal EngMod. In step 404, an actuation module 326 initially sets the BPV 22 at a fully closed position.

In step 406, the engine mode detection module 214 generates an engine mode signal EngMod based on signals received from a set of the sensors 206. For example only, the engine mode signal EngMod may be defined as provided by expression 1.

$$EngMod = F\{RPM, L, ALT, TORQ\} \qquad (1)$$

RPM is engine speed. L is engine load and may be determined based on a MAF signal. A MAF sensor may generate the MAF signal that indicates a rate of air flowing through an inlet of the intake manifold 30. ALT is altitude and TORQ is engine torque. The engine mode detection module 214 transmits the engine mode signal EngMod to the VGT mode selection module 200 and the set-point selection module 230.

In step 408, the feed-forward selection module 202 accesses an open-loop feed-forward value olFFV from an open-loop VGT lookup table 218 based on a control mode signal Ctrl, an engine speed signal EngSpd, and an engine torque signal EngTrq. For example, the feed-forward selection module 202 selects the open-loop VGT lookup table 218 when the VGT 20 is in the open-loop control mode. The feed-forward selection module 202 accesses the open-loop feed-forward value olFFV stored in the open-loop VGT lookup table 218 indexed based on the engine speed signal EngSpd and the engine torque signal EngTrq.

In step 410, when the engine speed is greater than a predetermined value PredRPM, control may proceed to step 412. Otherwise, control may return to step 406. In step 412, when the engine load is greater than a predetermined value PredMAF, control may proceed to step 414. Otherwise, control may return to step 406. In steps 410 and 412, the VGT mode selection module 200 determines whether the VGT 20 may be in a closed-loop control mode. Meeting both conditions in steps 410 and 412 indicates that the VGT 20 may be actuated in the closed-loop control mode.

In step 414, the control loop module 204 may receive a VGT position signal VGTpos from the VGT position sensor 310. A current value of the VGT position signal VGTpos may be stored in memory and accessed for a subsequent calculation. For example, the current value of the VGT position signal VGTpos may be used in determining an Integral value of a PID controller. The control loop module 204 may be a PID controller with three separate parameters: a proportional (P), an integral (I), and a derivative (D) values. Tuning the parameters is to achieve optimum P, I, and D values for a desired control response. The optimum values may provide smooth transitions between the open-loop control mode and the closed-loop control mode.

The P value may indicate a reaction to a current error. The I value may indicate a reaction based on a sum of errors. The D value may indicate a reaction based on a rate at which the current error is changing. The weighted sum of three values P, I, D, may be used to determine a loop control value $PID_{OUT}$ of the PID controller. For example only, the loop control value $PID_{OUT}$ may be defined as provided by expression 2.

$$PID_{OUT}=P+I+D \qquad (2)$$

P may be further defined as provided by expression 3.

$$P=K_p*E(t) \qquad (3)$$

$K_p$ is a constant that indicates a proportional gain. E is an error determined by a difference between a setpoint and a process value, where the setpoint indicates a desired value and the process value indicates a measured value. t is current time. I may be further defined as provided by expression 4.

$$I = K_i \int_0^t E(t)\,dt \qquad (4)$$

$K_i$ is a constant that indicates an integral gain. t is time in the past contributing to an integral response. D may be further defined as provided by expression 5.

$$D = K_d \frac{dE}{dt} \qquad (5)$$

$K_d$ is a constant that indicates a derivative gain.

In step 416, the feed-forward selection module 202 accesses a closed-loop feed-forward value clFFV from a closed-loop VGT lookup table 220 based on the control mode signal Ctrl, the engine speed signal EngSpd, and the engine torque signal EngTrq. For example, the VGT mode selection module 200 may generate a control mode signal Ctrl that indicates a closed-loop control mode. The closed-loop control mode indicates that the vanes in the VGT 20 are actuated based on feedback. The feedback may include a feed-forward value, an engine speed, and an engine load. The VGT mode selection module 200 transmits the control mode signal Ctrl to the feed-forward selection module 202. The feed-forward selection module 202 selects the closed-loop VGT lookup table 220. The feed-forward selection module 202 accesses the closed-loop feed-forward value clFFV stored in the closed-loop VGT lookup table 220 indexed based on the engine speed signal EngSpd and the engine torque signal EngTrq.

In step 418, the control loop module 204 sets the I value to $I_{VGT}$. $I_{VGT}$ may be set to zero initially. However, when $I_{VGT}$ is equal to zero, a VGT vane position variance may be significant because the VGT vane position variance is measured from zero to a current VGT position value. Minimizing the VGT vane position variance allows for a smooth transition to be provided from the open-loop control mode to the closed-loop control mode.

For example only, $I_{VGT}$ may be defined as provided by expression 6.

$$I_{VGT}=VGT_{POS}-FFD_{VGT} \qquad (6)$$

$VGT_{POS}$ is a current VGT position signal received from the VGT position sensor 310. $FFD_{VGT}$ is a feed-forward value accessed by the feed-forward selection module 202. Depending on $FFD_{VGT}$, $I_{VGT}$ may have a value close to $VGT_{POS}$. VGT vanes are actuated to a position in close proximity to a previous VGT vane position if $FFD_{VGT}$ is a small number relative to $VGT_{POS}$ since the previous VGT vane position is known by $VGT_{POS}$. Thus, the VGT vane position variance may be nominal. As a result, $I_{VGT}$ minimizes unsmooth transition effects caused by sudden VGT vane position changes.

In step 420, the vanes in the VGT 20 are actuated in the closed-loop control mode based on feedback signals. The feedback signals may include the closed-loop feed-forward value clFFV, a VGT control signal VGTctrl, and an error signal ERR. The VGT control signal VGTctrl may be generated by the actuation module 226 based on a scaled VGT signal cVGT. The scaled VGT signal cVGT may be generated by the limit module 224 based on a selected VGT signal sVGT. The selected VGT signal sVGT may be generated by the signal selection module 216 based on the control mode signal Ctrl, the open-loop feed-forward value olFFV and a summation value SUM.

In step 422, the summation module 222 sums the loop control value $PID_{OUT}$ and the open-loop feed-forward value olFFV to generate the summation value SUM. For example only, the summation value SUM may be defined as provided by expression 7.

$$SUM=PID_{OUT}+olFFV \qquad (7)$$

$PID_{OUT}$ is the loop control value olFFV is the open-loop feed-forward value.

In step 424, when a boost pressure delivered to the high-pressure compressor 54 is greater than a predetermined boost pressure PredBP, control may proceed to step 426. Otherwise, control may return to step 402. The VGT mode selection module 200 receives a MAP signal MAP from the MAP sensor 34 to determine the boost pressure. The predetermined boost pressure PredBP indicates that an exhaust power has enough energy to operate the BPV 22 in the closed-loop control mode.

In step 426, when the MAP signal MAP is greater than a predetermined value MAPsetpt, control may proceed to step 428. Otherwise, control may return to step 420. In step 428, when a VGT position signal VGTpos is less than a predetermined threshold PredVGT, control may proceed to step 430. Otherwise, control may return to step 420. In step 430, when conditions in steps 426 and 428 have been met for a predetermined period PredTime, control may proceed to step 432. Otherwise, control may return to step 420.

In step 432, the vanes in the VGT 20 are actuated in an open-loop control mode based on the input signals. In step 434, the actuation module 226 sets the VGT vane position at a maximum turbo efficiency based on a pressure ratio PresRatio and a corrected airflow value CorrAir. The pressure ratio PresRatio is determined based on a pressure ratio between a HPC inlet pressure and a HPC outlet pressure. The corrected airflow value CorrAir may be determined by a HPC detection module 314 based on a MAP signal MAP from the MAP sensor 34 and a temperature signal HPCtemp from the HPC inlet temperature sensor 312.

For example only, the corrected airflow value CorrAir may be defined as provided by expression 8.

$$CorrAir = \frac{ActualAirflow * (Tin/X)^{0.5}}{(Pin/Y)} \quad (8)$$

ActualAirflow is an amount of air moving through the engine 12 (e.g. 41.3 lbs/min). Tin is an absolute inlet temperature (e.g. Tin=70° F.+460=530° R). R stands for Rankine, which indicates an absolute temperature. The absolute temperature is a temperature in degrees Fahrenheit plus 460. X is a constant that indicates a standard temperature (e.g. 545° R). Pin is an absolute inlet pressure (e.g. Pin=−0.5 psig+14.7=14.2 psia, where psi stands for Pounds per Square Inch, "a" stands for absolute, and "g" stands for gauge). An absolute pressure is a gauge pressure measured by a gauge that reads 0 when it is open to outside air plus atmospheric pressure. The atmospheric pressure is about 14.7 psi at sea level. Y is a constant that indicates a standard pressure (e.g. 13.949 psia).

In step 436, the control loop module 304 may receive a BPV position signal BPVpos from the BPV position sensor 210. A current value of the BPV position signal BPVpos may be stored in memory and accessed for a subsequent calculation. For example, the current value of the BPV position signal BPVpos may be used in determining an Integral value of a PID controller. In step 438, the control loop module 304 sets the I value to $I_{BPV}$.

For example only, $I_{BPV}$ may be defined as provided by expression 9.

$$I_{BPV} = BPV_{POS} \quad (9)$$

$BPV_{POS}$ is a current BPV position signal received from the BPV position sensor 210. A feed-forward value accessed by the feed-forward selection module 302 for the BPV 22 is set to zero during a closed-loop control mode. Thus, $I_{BPV}$ is set based on $BPV_{POS}$ without regards to the closed-loop feed-forward value clFFV.

In step 440, the BPV 22 is actuated in a closed-loop control mode based on feedback signals. The feedback signals may include a BPV control signal BPVctrl and an error signal ERR. In step 442, when the current BPV position signal $BPV_{POS}$ is equal to zero, which means the BPV 22 is closed, the BPV 22 is kept closed and control may return to step 410. Otherwise, control ma proceed to 444.

In step 444, when the current BPV position signal $BPV_{POS}$ is greater than a predetermined threshold $PredBPV_{POS}$, control may proceed to step 446. Otherwise, control may return to step 440. The BPV 22 may be effective when the BPV opening is less than or equal to the predetermined threshold $PredBPV_{POS}$ during the closed-loop control mode. However, the BPV control module 28 loses boost control when the BPV opening exceeds the predetermined threshold $PredBPV_{POS}$ because the amount of the BPV opening makes no difference in air pressure.

In step 446, the BPV 22 is actuated in an open-loop control mode based on input signals. The input signals may include an engine speed signal EngSpd, an engine torque signal EngTrq, an error signal ERR, a VGT position signal VGTpos, a corrected airflow value CorrAir, and a HPC pressure ratio PresRatio. The BPV 22 may be fully opened and produce no more boost pressure. In step 448, the vanes in the VGT 20 are actuated in an open-loop control mode based on input signals. The input signals may include an engine speed signal EngSpd, an engine torque signal EngTrq, a BPV position signal BPVpos, and an engine mode signal EngMod.

In step 450, the feed-forward selection module 202 accesses an open-loop feed-forward value olFFV from an open-loop VGT lookup table 218 based on a control mode signal Ctrl, an engine speed signal EngSpd, and an engine torque signal EngTrq. In step 452, when conditions for closing of the BPV 22 are met, control may proceed to step 454. Otherwise, control may return to step 448. The conditions for closing of the BPV 22 may be determined based on a relationship between engine speed and engine load. The relationship may be stored in a calibrated lookup table in memory. In step 454, the actuation module 326 may close the BPV 22 and proceed to step 444. Control may continue as long as the turbocharger control system 14 is in operation.

The above-described steps are meant to be illustrative examples; the steps may be performed sequentially, synchronously, simultaneously, continuously, during overlapping time periods or in a different order depending upon the application.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A method of operating a turbocharged engine system comprising:
    generating a control mode signal based on an engine speed signal, an engine torque signal, and an engine mode signal;
    indicating one of an open-loop control mode and a closed-loop control mode of a sequential turbocharger of an engine;
    determining a feed-forward value based on the control mode signal, the engine speed signal, and the engine torque signal; and
    determining a loop control value based on the feed-forward value, a variable geometry turbine (VGT) control signal, and an error signal when the control mode signal transitions from the open-loop control mode to the closed-loop control mode;
    generating the VGT control signal based on the loop control value; and
    controlling a VGT of the sequential turbocharger according to the VGT control signal.

2. The method of operating a turbocharged engine system of claim 1, further comprising generating the engine mode signal based on at least one of the engine speed signal, the engine torque signal, a mass airflow (MAF) signal, and an altitude.

3. The method of operating a turbocharged engine system of claim 1, further comprising:

determining a summation value based on the feed-forward value and the loop control value;
generating a selected VGT signal based on the summation value and the feed-forward value;
generating a scaled VGT signal based on the selected VGT signal; and generating the VGT control signal based on the scaled VGT signal to actuate vanes in the VGT of the sequential turbocharger.

4. The method of operating a turbocharged engine system of claim 3, further comprising:
operating the VGT in the closed-loop control mode based on an engine speed and an engine load; and
closing a bypass valve (BPV) of the sequential turbocharger based on a relationship between the engine speed and the engine load.

5. The method of operating a turbocharged engine system of claim 4, further comprising operating the VGT and the BPV based on the VGT control signal and a BPV control signal respectively in the open-loop control mode when a BPV position signal is greater than a predetermined position value.

6. The method of operating a turbocharged engine system of claim 4, further comprising operating the VGT in the open-loop control mode and operating the BPV in the closed-loop control mode when a manifold absolute pressure (MAP) signal is greater than a predetermined pressure for a predetermined period and a VGT position signal is less than a predetermined threshold for the predetermined period.

7. The method of operating a turbocharged engine system of claim 1, further comprising:
generating a corrected airflow value based on a MAP signal from a MAP sensor and a temperature signal from a high-pressure compressor (HPC) inlet temperature sensor;
generating a set-point signal based on at least one of the engine mode signal, the engine speed signal, and the engine torque signal;
generating the error signal based on a difference between the set-point signal and the MAP signal; and
generating a bypass valve (BPV) control signal to control a BPV of the sequential turbocharger based on the corrected airflow value and the error signal.

8. The method of operating a turbocharged engine system of claim 7, further comprising:
generating the control mode signal based on at least one of a VGT position signal, a BPV position signal, the corrected airflow value, a HPC pressure ratio, and the error signal; and
determining the HPC pressure ratio based on a pressure ratio between a HPC inlet pressure and a HPC outlet pressure.

9. The method of operating a turbocharged engine system of claim 1, further comprising:
determining the loop control value based on a bypass valve (BPV) control signal and the error signal when the control mode signal transitions from the open-loop control mode to the closed-loop control mode; and
controlling a BPV of the sequential turbocharger based on the BPV control signal.

10. The method of operating a turbocharged engine system of claim 9, further comprising:
generating a selected BPV signal based on the loop control value and the feed-forward value;
generating a scaled BPV signal based on the selected BPV signal; and
generating the BPV control signal based on the scaled BPV signal to actuate a BPV of the sequential turbocharger.

11. A turbocharged engine system comprising:
a mode selection module that generates a control mode signal based on an engine speed signal, an engine torque signal, and an engine mode signal,
wherein the control mode signal indicates one of an open-loop control mode and a closed-loop control mode of a sequential turbocharger of an engine;
a feed-forward selection module that determines a feed-forward value based on the control mode signal, the engine speed signal, and the engine torque signal; a control loop module that determines a loop control value based on the feed-forward value, a variable geometry turbine (VGT) control signal, and an error signal when the control mode signal transitions from the open-loop control mode to the closed-loop control mode; and
an actuation module that generates the VGT control signal based on the loop control value and controls a VGT of the sequential turbocharger according to the VGT control signal.

12. The turbocharged engine system of claim 11, further comprising an engine mode detection module that generates the engine mode signal based on at least one of the engine speed signal, the engine torque signal, a mass airflow (MAF) signal, and an altitude.

13. The turbocharged engine system of claim 11, further comprising:
a summation module that determines a summation value based on the feed-forward value and the loop control value;
a signal selection module that generates a selected VGT signal based on the summation value and the feed-forward value; and
a limit module that generates a scaled VGT signal based on the selected VGT signal;
wherein the actuation module generates the VGT control signal based on the scaled VGT signal to actuate vanes in the VGT of the sequential turbocharger.

14. The turbocharged engine system of claim 13, comprising a turbocharger control module that includes the mode selection module, the feed-forward selection module, and the control loop module, and that operates the VGT in the closed-loop control mode based on an engine speed and an engine load,
wherein the actuation module closes a bypass valve (BPV) of the sequential turbocharger based on a relationship between the engine speed and the engine load.

15. The turbocharged engine system of claim 14, wherein the turbocharger control module operates the VGT and the BPV based on the VGT control signal and a BPV control signal respectively in the open-loop control mode when a BPV position signal is greater than a predetermined position value.

16. The turbocharged engine system of claim 14, wherein the turbocharger control module operates the VGT in the open-loop control mode and operates the BPV in the closed-loop control mode when a manifold absolute pressure (MAP) signal is greater than a predetermined pressure for a predetermined period and a VGT position signal is less than a predetermined threshold for the predetermined period.

17. The turbocharged engine system of claim 11, further comprising:
a high-pressure compressor (HPC) detection module that generates a corrected airflow value based on a MAP signal from a MAP sensor and a temperature signal from a HPC inlet temperature sensor;

a set-point selection module that generates a set-point signal based on at least one of the engine mode signal, the engine speed signal, and the engine torque signal;

an error module that generates the error signal based on a difference between the set-point signal and the MAP signal; and a second actuation module configured to generate a bypass valve (BPV) control signal to control a BPV of the sequential turbocharger based on the corrected airflow value and the error signal.

18. The turbocharged engine system of claim 17, wherein the mode selection module generates the control mode signal based on at least one of a VGT position signal, a BPV position signal, the corrected airflow value, a HPC pressure ratio, and the error signal, and wherein the HPC pressure ratio is determined based on a pressure ratio between a HPC inlet pressure and a HPC outlet pressure.

19. The turbocharged engine system of claim 11, wherein:

the control loop module determines the loop control value based on a bypass valve (BPV) control signal and the error signal when the control mode signal transitions from the open-loop control mode to the closed-loop control mode; and controlling a BPV of the sequential turbocharger based on the BPV control signal.

20. The turbocharged engine system of claim 19, further comprising:

a signal selection module that generates a selected BPV signal based on the loop control value and the feed-forward value;

a limit module that generates a scaled BPV signal based on the selected BPV signal; and the actuation module that-generates the BPV control signal based on the scaled BPV signal to actuate the BPV of the sequential turbocharger.

21. The turbocharged engine system of claim 11, wherein the mode selection module transitions the control mode signal from the open-loop control mode to the closed-loop control mode when the engine speed signal is greater than a predetermined speed and load on the engine is greater than a predetermined value.

* * * * *